United States Patent
Motoya et al.

(10) Patent No.: US 9,255,691 B2
(45) Date of Patent: Feb. 9, 2016

(54) LIGHT SOURCE DEVICE AND PROJECTION TYPE DISPLAY APPARATUS EMPLOYING SAME LIGHT SOURCE DEVICE

(71) Applicant: Panasonic Corporation, Kadoma-shi, Osaka (JP)

(72) Inventors: Atsushi Motoya, Shiga (JP); Yohei Katsumata, Osaka (JP); Yoshimasa Fushimi, Osaka (JP)

(73) Assignee: Panasonic Intellectual Property Management, Co., Ltd., Osaka (JP)

( * ) Notice: Subject to any disclaimer, the term of this patent is extended or adjusted under 35 U.S.C. 154(b) by 229 days.

(21) Appl. No.: 13/867,254

(22) Filed: Apr. 22, 2013

(65) Prior Publication Data

US 2013/0286359 A1    Oct. 31, 2013

(30) Foreign Application Priority Data

Apr. 26, 2012  (JP) ................. 2012-101200

(51) Int. Cl.
 G03B 21/20    (2006.01)
 H04N 9/31     (2006.01)
 F21V 9/08     (2006.01)
 G03B 33/12    (2006.01)

(52) U.S. Cl.
 CPC ............... *F21V 9/08* (2013.01); *G03B 21/204* (2013.01); *G03B 33/12* (2013.01)

(58) Field of Classification Search
 CPC .... G03B 21/204; G03B 33/08; H04N 9/3161; H04N 9/3197; H04N 9/3164; G02B 26/008; F21V 9/08; F21V 13/08
 See application file for complete search history.

(56) References Cited

U.S. PATENT DOCUMENTS

| | | | |
|---|---|---|---|
| 7,652,301 B2 | 1/2010 | Bierhuizen et al. |
| 8,269,237 B2 | 9/2012 | Morioka et al. |
| 8,337,027 B2 | 12/2012 | Ogura et al. |
| 8,616,708 B2 | 12/2013 | Masuda |
| 8,820,940 B2 | 9/2014 | Kita |
| 2006/0139926 A1 | 6/2006 | Morioka et al. |

(Continued)

FOREIGN PATENT DOCUMENTS

| | | |
|---|---|---|
| JP | 2006-210887 A | 8/2006 |
| JP | 2010-023318 A | 2/2010 |

(Continued)

OTHER PUBLICATIONS

Office Action issued in counterpart Japanese Patent Application No. 2012-101200, dated Aug. 18, 2015 (6 pages).

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A light source device and a projection type display apparatus include: an excitation light source; and a fluorescence light-emitting plate including a fluorescence light-emitting section arranged opposite to the excitation light source and a reflection section containing titanium oxide located on the opposite side of the excitation light source as viewed from the side of the fluorescence light-emitting section and arranged such as to be joined to the fluorescence light-emitting section. Then, excitation light from the excitation light source is projected onto the fluorescence light-emitting section so that fluorescence emission light is emitted from the fluorescence light-emitting section and reflected fluorescence light is emitted from the reflection section.

12 Claims, 6 Drawing Sheets

(56) References Cited

U.S. PATENT DOCUMENTS

| | | | |
|---|---|---|---|
| 2007/0001602 A1* | 1/2007 | Miyake et al. | 313/582 |
| 2008/0212213 A1* | 9/2008 | Kogure et al. | 359/838 |
| 2009/0045416 A1 | 2/2009 | Bierhuizen et al. | |
| 2010/0231863 A1* | 9/2010 | Hikmet et al. | 353/31 |
| 2010/0328617 A1 | 12/2010 | Masuda | |
| 2011/0051102 A1 | 3/2011 | Ogura et al. | |
| 2011/0149549 A1 | 6/2011 | Miyake | |
| 2011/0310362 A1 | 12/2011 | Komatsu | |
| 2011/0310363 A1 | 12/2011 | Kita | |

FOREIGN PATENT DOCUMENTS

| | | |
|---|---|---|
| JP | 2010-537400 | 12/2010 |
| JP | 2011-013315 A | 1/2011 |
| JP | 2011-53320 | 3/2011 |
| JP | 2011-129406 | 6/2011 |
| JP | 2011-168030 A | 9/2011 |
| JP | 2012-3923 | 1/2012 |
| JP | 2012-004009 A | 1/2012 |
| JP | 2012-78707 | 4/2012 |
| JP | 2014-501438 A | 1/2014 |
| WO | 2012/091975 A1 | 7/2012 |

* cited by examiner

LIGHT SOURCE DEVICE AND PROJECTION TYPE DISPLAY APPARATUS EMPLOYING SAME LIGHT SOURCE DEVICE

BACKGROUND OF THE DISCLOSURE

1. Field of the disclosure

The present disclosure relates to a light source device including an excitation light source and a fluorescence light-emitting plate, and to a projection type display apparatus employing this light source device.

2. Description of the Prior Art

In recent years, various kinds of apparatuses are proposed for projection type display apparatuses in which light emitted from a light source is condensed onto an image display device such as a DMD (Digital Mirror Device) and a liquid crystal device so that a color image is projected onto a screen.

The light source of one of the projection type display apparatuses having been proposed is constructed from: a semiconductor light-emitting element like a light-emitting diode and a semiconductor laser; and a fluorescence light-emitting plate onto which excitation light from the semiconductor light-emitting element is projected so that fluorescence emission light is emitted.

In such projection type display apparatuses, for the purpose of realizing display of a high luminance image on a large screen, efforts are being made for luminance enhancement in the light sources (for example, see Japanese Laid-Open Patent Publication No. 2011-53320).

In the conventional projection type display apparatus disclosed in Japanese Laid-Open Patent Publication No. 2011-53320, the weight density content of green phosphor in the fluorescent substance layer and the film thickness of the layer are set at predetermined values so that the light emission intensity of the fluorescence emission light is enhanced.

In the fluorescence light-emitting region of the projection type display apparatus of Japanese Laid-Open Patent Publication No. 2011-53320, a reflecting surface is formed on the surface of a metallic material or the like by silver vapor deposition or the like. Then, a transparent protective film of magnesium fluoride or the like is formed on the surface of the reflecting surface by spattering. Further, a green phosphor layer is provided on the surface of the protective film. That is, the fluorescence light-emitting region of Japanese Laid-Open Patent Publication No. 2011-53320 indicates a configuration that a protective film of magnesium fluoride or the like and a reflecting surface of silver or the like are formed under a green phosphor layer.

For the purpose of improving utilization of reflected light in the fluorescence light-emitting region, further improvement in the reflectivity is effective. The configuration of the reflecting surface of silver provides a relative reflectivity of approximately 95%. However, a configuration is desired that a still higher reflectivity is achieved so that an interface loss between the fluorescent substance layer and the substrate is reduced. Nevertheless, in the configuration employing silver, a limitation in the physical properties of silver itself causes difficulty in further improvement of the reflectivity.

Further, in the case of the reflecting surface formed by vapor deposition of silver, the use of silver which is an expensive metal causes a disadvantage in the cost. Further, preparation processing for the substrate is necessary for ensuring the flatness and the surface roughness of the substrate, and hence another disadvantage is caused in the cost. Further, a possibility arises that when high luminance excitation light is projected, heat is generated and causes thermal oxidation of silver. Silver has unsatisfactory light resistance and moisture resistance and need be avoided from thermal oxidation. Thus, a dense and pinhole-free protective film is necessary and a disadvantage is caused in the cost.

As such, the reflecting surface employing silver has problems that its physical properties cause a limitation in improvement of the reflectivity and that cost reduction is difficult.

SUMMARY OF THE DISCLOSURE

In one general aspect, the instant application describes a light source device that includes an excitation light source; and a fluorescence light-emitting plate including a fluorescence light-emitting section arranged opposite to said excitation light source and a reflection section containing titanium oxide located on the opposite side of said excitation light source as viewed from the side of the fluorescence light-emitting section and arranged such as to be joined to the fluorescence light-emitting section.

DETAILED DESCRIPTION OF THE PREFERRED EMBODIMENTS

A light source device 5 and, a projection type display apparatus 1 according to an embodiment of the present disclosure are described below in detail with reference to the drawings. Here, in the following description, if necessary, terms indicating particular directions or positions are employed (like "up", "down", "right", "left", and other terms containing these). However, those terms are used merely for simplicity of understanding of the present disclosure with reference to the drawings. That is, the use of these terms does not limit the technical scope of the present disclosure. Further, like numerals appearing in different drawings designate like parts or members.

First Embodiment

With reference to FIGS. 1 to 5, a light source device 5 and a projection type display apparatus 1 according to a first embodiment are described below in detail. The projection type display apparatus 1 according to an embodiment of the present disclosure includes at least: a light source device 5 including at least one fluorescence emission light source 24 for emitting fluorescence emission light; an image display device 38 for forming an image corresponding to a video signal; and an optical device 3 for guiding light from the light source device 5 to the image display device 38 so as to project onto a screen an image emitted from the image display device 38.

First, a main configuration of the circuit of the projection type display apparatus 1 is described below with reference to FIG. 1.

Figure 1:
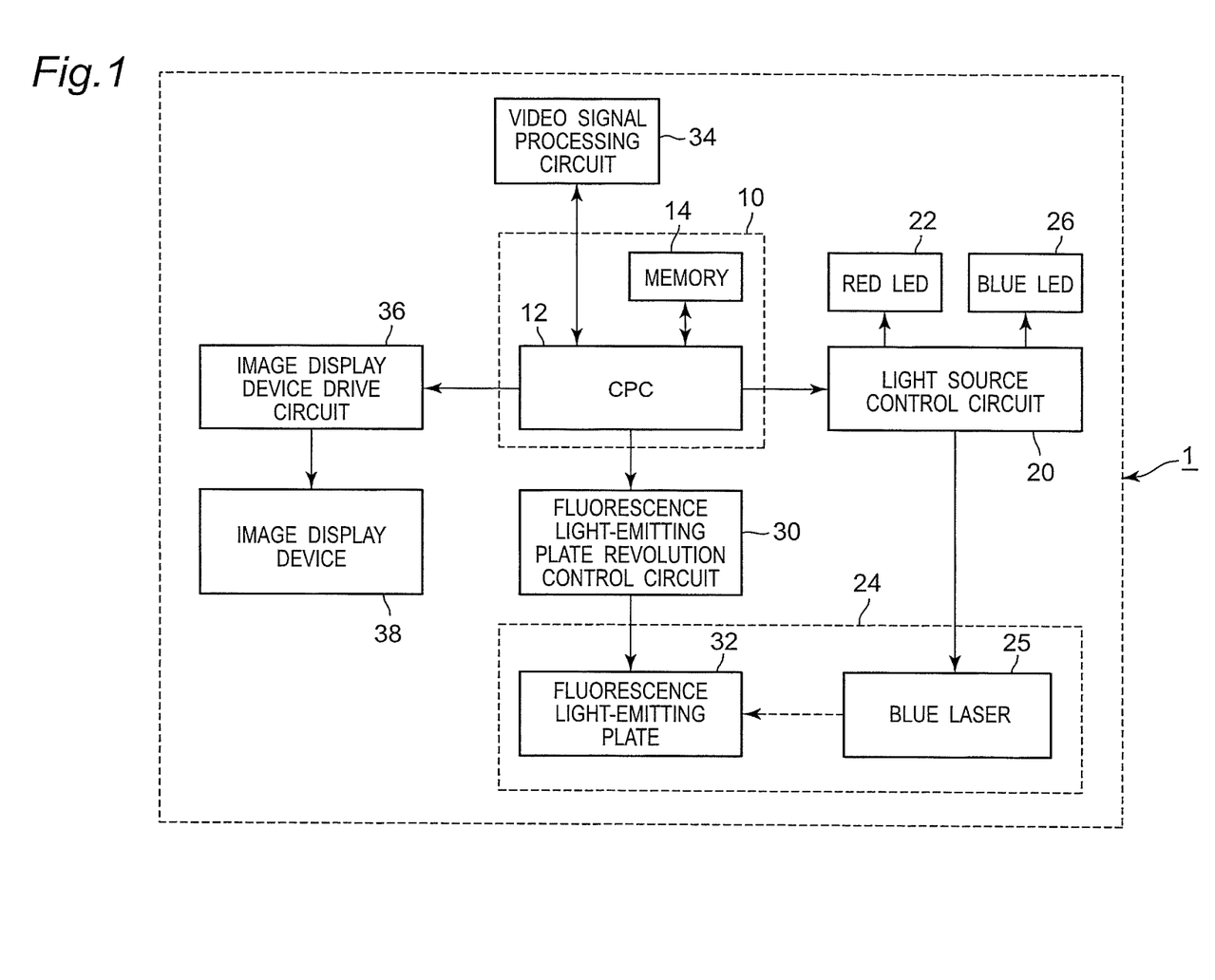
FIG. 1 is a block diagram showing a circuit configuration of a projection type display apparatus according to the present disclosure.

In FIG. 1, the projection type display apparatus 1 includes a control section 10, a light source control circuit 20, a fluorescence light-emitting plate revolution control circuit 30, a video signal processing circuit 34, and an image display device drive circuit 36. The control section 10 includes: a CPU 12 for controlling the operation of various kinds of circuits; and a memory 14 including a ROM for storing an operation program and a RAM serving as a work memory. The control section 10 is electrically connected to the light source control circuit 20, the fluorescence light-emitting plate revolution control circuit 30, the video signal processing circuit 34, and the image display device drive circuit 36 and thereby controls them.

The light source control circuit 20 controls the optical outputs of blue light emitted from a blue light-emitting diode 26, red light emitted from a red light-emitting diode 22, and blue laser light emitted from a blue laser 25.

The fluorescence light-emitting plate revolution control circuit 30 controls high-speed revolution of the fluorescence light-emitting plate 32. The video signal processing circuit 34 generates a video signal from an inputted video signal and then outputs the generated video signal through the control section 10 to the image display device drive circuit 36. On the basis of the video signal, the image display device drive circuit 36 drives the image display device 38.

Figure 2:
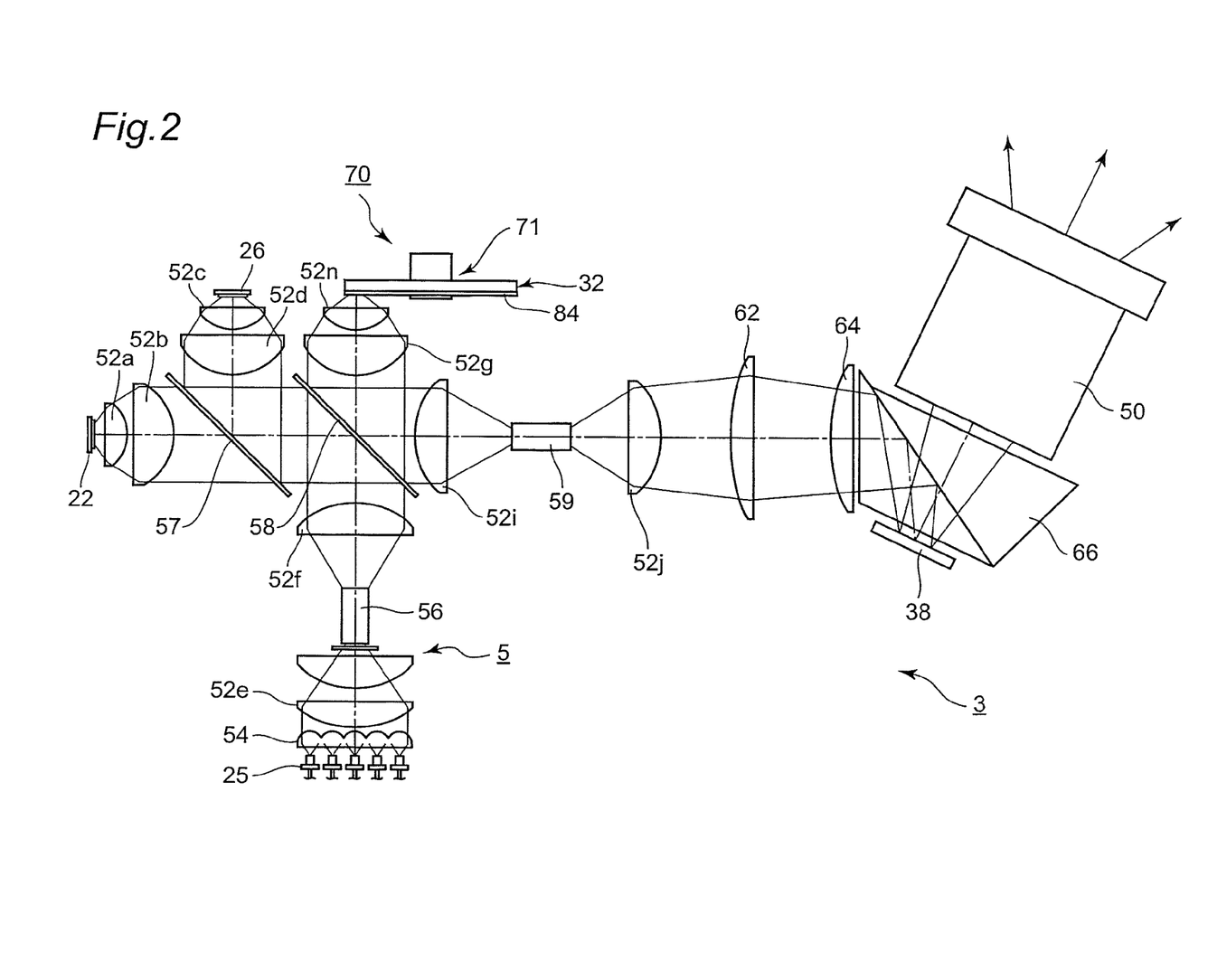
FIG. 2 is a main-part configuration diagram of an optical device in a projection type display apparatus shown in FIG. 1.

The optical device 3 of the projection type display apparatus 1 shown in FIG. 2 includes a light source device 5 including: the red light-emitting diode (red LED) 22; the blue light-emitting diode (blue LED) 26; the blue laser (the semiconductor light-emitting element) 25 serving as an excitation light source; and the fluorescence light-emitting plate 32 for emitting green fluorescence emission light when blue laser light from the blue laser 25 is projected. The blue laser 25 serving as an excitation light source is arranged opposite to the fluorescence light-emitting layer 84 of the fluorescence light-emitting plate 32. Then, the blue laser 25 and the green fluorescence light-emitting layer 84 of the fluorescence light-emitting plate 32 constitute a green fluorescence emission light source 24.

In order that a luminance required in the light source should be ensured, at least one red light-emitting diode 22 and blue light-emitting diode 26 may be employed. Then, in order that the optical output from the fluorescence light-emitting plate 32 should be improved so that a green luminance should be ensured, a plurality of blue lasers 25 (e.g., 30 pieces in total in the form of a matrix of 6×5) may be employed. A collimator lens 54 is arranged in front of each blue laser 25. Each collimator lens 54 converts each blue laser light into an approximately parallel light beam and, at that time, one light beam is emitted. For the purpose of cooling of the red light-emitting diode 22 and the blue light-emitting diode 26, a heat sink is arranged on the non-emission surface side of each of the red light-emitting diode 22 and the blue light-emitting diode 26. For the purpose of cooling of the blue laser 25, a heat pipe is arranged on the non-emission surface side of the blue laser 25.

The blue laser 25 emits light having a wavelength from 440 to 455 nm (e.g., 448 nm). The blue laser 25 has an optical output intensity of, for example, 40 W. As the excitation light source, a blue light-emitting diode may be employed in place of the blue laser 25. The blue light-emitting diode 26 emits light having a wavelength from 450 to 470 nm (e.g., 460 nm). The blue light-emitting diode 26 has an optical output intensity of, for example, 15.5 W. The red light-emitting diode 22 emits light having a wavelength from 650 to 660 nm (e.g., 640 nm). The red light-emitting diode 22 has an optical output intensity of, for example, 8.5 W.

Here, when blue excitation light from the blue laser 25 or the blue light-emitting diode is projected onto the green fluorescence light-emitting layer 84 on the fluorescence light-emitting plate 32, green fluorescence emission light is emitted. Further, when blue excitation light from the blue laser or the blue light-emitting diode is projected onto the red fluorescence section, red fluorescence emission light is emitted. Further, as the excitation light source, a laser or a light-emitting diode that emits ultraviolet light or near ultraviolet light may be employed. In this case, when excitation light having a wavelength of ultraviolet or near ultraviolet is projected onto the blue fluorescence section, the green fluorescence section, or the red fluorescence section, corresponding fluorescence emission light of blue, green, or red is emitted, respectively.

Figure 4A:
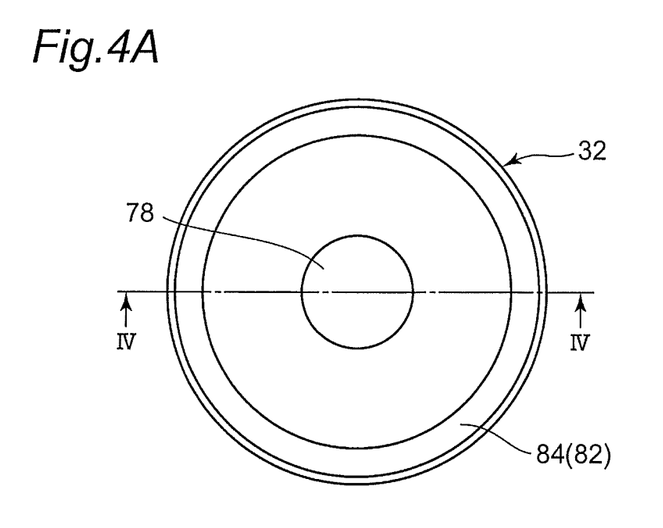
FIG. 4A is a front view showing a fluorescence light-emitting plate according to a first embodiment and a second embodiment of the present disclosure.
Figure 4B:
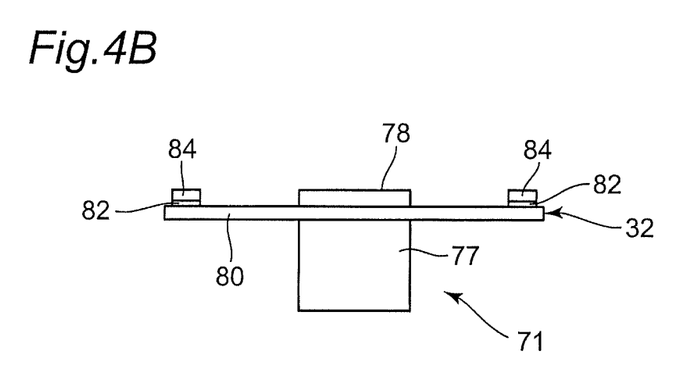
FIG. 4B is a sectional view taken along line IV-IV showing a fluorescence light-emitting plate according to a first embodiment and a second embodiment of the present disclosure.

As shown in FIGS. 4A and 4B, the fluorescence light-emitting plate 32 according to the first embodiment includes a base substrate 80, a reflection layer (a reflection section) 82 formed in close contact with the base substrate 80, and a fluorescence light-emitting layer (a fluorescence light-emitting section) 84 formed in close contact with the reflection layer 82. In FIG. 4B, excitation light from the blue laser 25 (not shown) serving as an excitation light source is projected from the upward direction to downward direction onto the fluorescence light-emitting layer 84. Thus, the reflection layer 82 is arranged on the opposite side of the blue laser 25 with respect to the fluorescence light-emitting layer 84.

The base substrate 80 has, for example, a disc shape and is constructed from a material having a satisfactory thermal conductivity and a satisfactory heat resistance. For example, the base substrate 80 has a thermal conductivity of 0.8 to 20 W/m·K. Materials available for the base substrate are: ceramic materials such as glass and alumina; metallic materials such as aluminum, copper, and stainless steel; and a silicon substrate. An example of the base substrate 80 composed of aluminum is a highly-shining aluminum substrate or alternatively an improved-reflectivity aluminum substrate obtained by vapor deposition of aluminum onto the surface of a metal substrate and then coating with a dielectric protective film (an improved-reflectivity film). The thickness of the base substrate 80 is, for example, 0.2 mm to 1.5 mm. As described later, as the binder in the reflection layer 82 and the binder in the fluorescence light-emitting layer 84, an organic binder or an inorganic binder may be employed. For example, when an organic binder is employed, the base substrate 80 having a heat resistance of approximately 200° C. may be adopted. When an inorganic binder is employed, the base substrate 80 having a heat resistance of approximately 600° C. may be adopted.

The reflection layer 82 formed on the base substrate 80 is a layer containing titanium oxide and binder. The thickness of the reflection layer 82 is, for example, 10 μm to 350 μm. A preferable thickness of the reflection layer 82 is 10 μm to 100

µm. When the thickness of the reflection layer 82 is smaller than 10 µm, only a small amount of titanium oxide is present in the reflection layer 82. This reduces fluorescence emission light reflected by the reflection layer 82. When the thickness of the reflection layer 82 is greater than 350 µm, heat generated in the part onto which excitation light is projected is accumulated in the reflection layer 82 and hardly escapes from the side of the base substrate 80. Thus, a temperature rise is caused in the fluorescence light-emitting layer 84. This reduces the fluorescence emission light emitted to the outside and hence reduces the conversion efficiency of the fluorescence light-emitting layer 84. However, when the heat radiation property of the base substrate 80 and/or the reflection layer 82 itself is improved, even the reflection layer 82 having a greater thickness becomes available. That is, employment of the base substrate 80 having a higher thermal conductivity and/or the reflection layer 82 composed of titanium oxide and inorganic binder glass is effective in improvement of the heat radiation property. As a result, improvement is achieved in the conversion efficiency of the fluorescence light-emitting layer 84.

The titanium oxide employed in the reflection layer 82 is powder having a crystal structure of rutile type (refractive index: approximately 2.72) or anatase type (refractive index: approximately 2.52). The grain diameter of the titanium oxide is, for example, 3 µm to 100 µm.

Binders available for the reflection layer 82 are organic binders and inorganic binders. Such organic binders include a silicone resin (refractive index: 1.35 to 1.45, thermal conductivity: 0.15 W/m·K, and heat resistance: approximately 200° C.) and an epoxy resin (refractive index: 1.35 to 1.45, thermal conductivity: 0.3 W/m·K, and heat resistance: approximately 150° C.). Further, such inorganic binders include a borate glass (refractive index: 1.40 to 1.65, thermal conductivity: 1.0 to 1.5 W/m·K, and heat resistance: approximately 350° C.) and a phosphate glass (refractive index: 1.40 to 1.65, thermal conductivity: 1.0 to 1.5 W/m·K, and heat resistance: approximately 350° C.).

The content ratio of titanium oxide in the reflection layer 82 containing titanium oxide and binder is, for example, 10 to 65 vol %. Here, when the specific gravity of titanium oxide is 4.5 and the specific gravity of a binder composed of silicone resin is 1.86, the content ratio of titanium oxide in the reflection layer 82 is, for example, 20 to 80 wt %.

The reflection layer 82 is formed on the base substrate 80 by using a known art that, for example, a paste obtained by mutually mixing titanium oxide, a binder, and, if necessary, appropriate additives is applied or screen-printed. The reflection layer 82 is formed in substantially the same shape as the fluorescence light-emitting layer 84 onto which laser light for excitation is projected. In a case that the fluorescence light-emitting plate 32 is used in a revolving state, the reflection layer 82 is formed in a ring shape. In a case that the fluorescence light-emitting plate 32 is used in a non-revolving state (that is, in a stationary state), the reflection layer 82 is formed, for example, in a circular or rectangular shape.

On the above-mentioned reflection layer 82, the fluorescence light-emitting layer 84 is formed further. The fluorescence light-emitting layer 84 is a layer containing fluorescence light-emitting material and binder. The thickness of the fluorescence light-emitting layer 84 is, for example, 50 µm to 400 µm. A preferable thickness of the fluorescence light-emitting layer 84 is 200 µm to 300 µm. When the thickness of the fluorescence light-emitting layer 84 is smaller than 50 µm, only a small amount of fluorescence light-emitting material is present in the fluorescence light-emitting layer 84. This reduces generation of fluorescence emission light. When the thickness of the fluorescence light-emitting layer 84 is greater than 400 µm, the frequency increases that fluorescence emission light generated by the projection of excitation light is absorbed inside the fluorescence light-emitting layer 84. This reduces fluorescence emission light emitted to the outside of the fluorescence light-emitting layer 84, and hence reduces the conversion efficiency of the fluorescence light-emitting layer 84. The grain diameter in the fluorescence light-emitting layer 84 is, for example, 10 µm to 20 µm. The green fluorescence light-emitting layer 84 contains, for example, Ce-activated YAG-family phosphor or Ce-activated LuAG-family phosphor. Further, the red fluorescence light-emitting layer contains, for example, europium-activated nitride phosphor. The blue fluorescence light-emitting layer contains, for example, europium-activated aluminate barium magnesium phosphor.

Binders available for the fluorescence light-emitting layer 84 are organic binders and inorganic binders. Such organic binders are resins having heat resistance like a silicone resin (refractive index: 1.35 to 1.45, thermal conductivity: 0.15 W/m·K, and heat resistance: approximately 200° C.) and an epoxy resin (refractive index: 1.35 to 1.45, thermal conductivity: 0.3 W/m·K, and heat resistance: approximately 150° C.). Further, such inorganic binders include a borate glass (refractive index: 1.40 to 1.65, thermal conductivity: 1.0 to 1.5 W/m·K, and heat resistance: approximately 350° C.) and a phosphate glass (refractive index: 1.40 to 1.65, thermal conductivity: 1.0 to 1.5 W/m·K, and heat resistance: approximately 350° C.).

A constitution that the refractive index of the binder in the fluorescence light-emitting layer 84 and the refractive index of the binder in the reflection layer 82 are almost the same as each other is effective in reducing the interface loss between the fluorescence light-emitting layer 84 and the reflection layer 82. Thus, it is preferable that the binder in the fluorescence light-emitting layer 84 and the binder in the reflection layer 82 are, for example, composed of an identical material of the same refractive index like an organic binder (e.g., a silicone resin) and an inorganic binder (e.g., a borate glass). For example, when there is a refractive index difference of 0.1 or smaller between the binder in the fluorescence light-emitting layer 84 and the binder in the reflection layer 82, a satisfactory effect is obtained in reduction of the interface loss between the fluorescence light-emitting layer 84 and the reflection layer 82.

The content ratio of the fluorescence light-emitting material in the fluorescence light-emitting layer 84 containing fluorescence light-emitting material and binder is, for example, 30 to 65 vol %. When the content ratio of the fluorescence light-emitting material in the fluorescence light-emitting layer 84 is lower than 30 vol. %, only a small amount of fluorescence light-emitting material is present in the fluorescence light-emitting layer 84. This reduces generation of fluorescence emission light. When the content ratio of the fluorescence light-emitting material in the fluorescence light-emitting layer 84 is higher than 65 vol %, fluorescence light-emitting material located in the surroundings of fluorescence light-emitting material having emitted light absorbs the light emitted from the fluorescence light-emitting material having emitted light. This reduces the fluorescence emission light emitted to the outside and hence reduces the conversion efficiency of the fluorescence light-emitting layer 84. Here, when the specific gravity of the fluorescence light-emitting material is 4.5 and the specific gravity of the binder composed of silicone resin is 1.86, the content ratio of the fluorescence light-emitting material in the fluorescence light-emitting layer 84 is, for example, 50 to 80 wt %.

The reflection layer 82 is formed on the base substrate 80 by using a known art of thick film formation technology that, for example, a paste obtained by mutually mixing titanium oxide, a binder, and, if necessary, appropriate additives is applied or screen-printed. The reflection layer 82 is formed in substantially the same shape as the fluorescence light-emitting layer 84 onto which laser light for excitation is projected. When the fluorescence light-emitting plate 32 is used in a revolving state, the reflection layer 82 may be formed in a ring shape. In a case that the fluorescence light-emitting plate 32 is used in a non-revolving state (that is, in a stationary state), the reflection layer 82 may be formed, for example, in a circular or rectangular shape.

Figure 5:
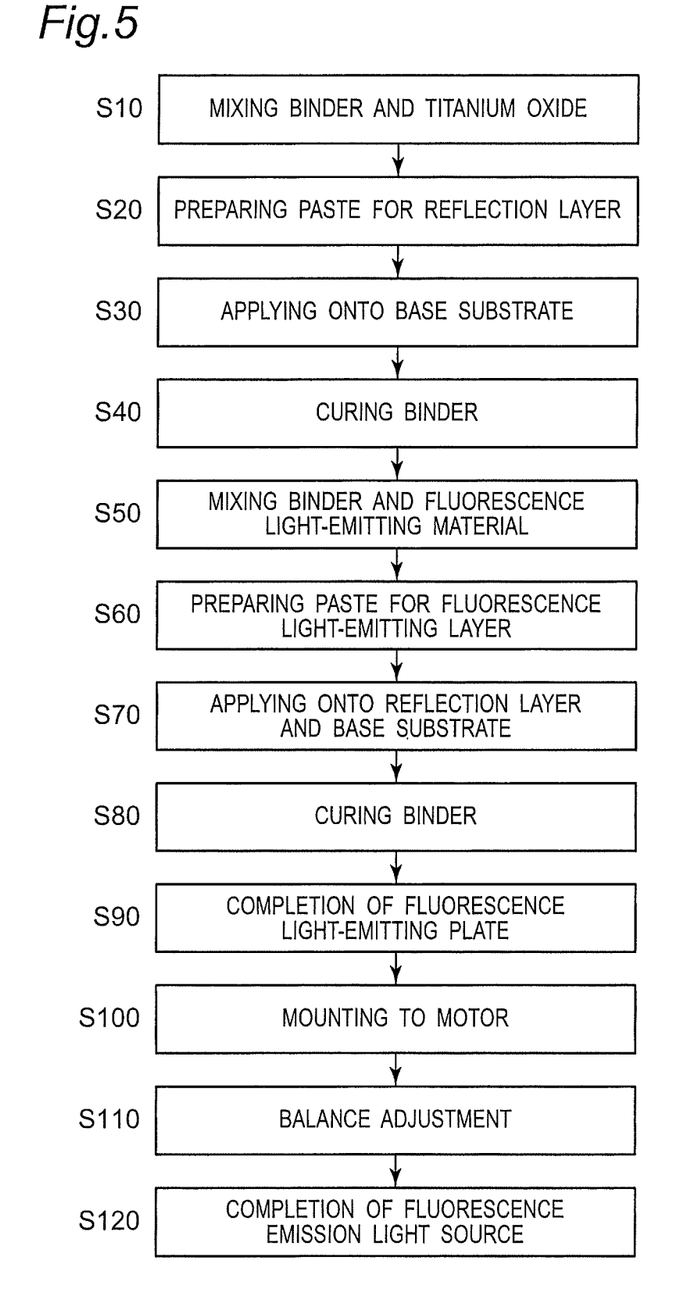
FIG. 5 is a diagram showing a fabrication process for a fluorescence light-emitting plate according to a first embodiment of the present disclosure.

A production process for a fluorescence light-emitting plate unit 70 in which the fluorescence light-emitting layer 84 and the reflection layer 82 employing an organic binder are formed on the fluorescence light-emitting plate 32 is described below with reference to FIG. 5.

In a manner that a desired weight percentage (e.g., a titanium oxide content of 70 wt %) should be achieved, a two-component silicone resin serving as an organic binder and titanium oxide serving as a reflective material are prepared and then the silicone resin and the titanium oxide are stirred and mixed with each other (step S10). Then, paste for reflection layer without air bubbles is produced by using a defoaming device (step S20). Then, in a manner that a desired thickness (e.g., a thickness of 50 μm) should be achieved, the paste for reflection layer is applied on the base substrate 80 by screen printing (step S30). The base substrate 80 on which the paste for reflection layer are applied so that a reflecting layer 82 is formed is heat-cured under the conditions of 150° C. and 30 minutes by using a heat curing furnace (step S40). The reflection layer 82 having been heat-cured is tightly and closely joined to the base substrate 80.

Then, in a manner that a desired weight percentage (e.g., a fluorescence light-emitting material content of 75 wt %) should be achieved, a two-component silicone resin identical to the silicone resin used as the binder for reflection layer and a Ce-activated YAG-family phosphor serving as a fluorescence light-emitting material are prepare and then the silicone resin and the Ce-activated YAG-family phosphor are stirred and mixed with each other (step S50). Then, paste for fluorescence light-emitting layer without air bubbles is produced by using a defoaming device (step S60). In a manner that a desired thickness (e.g., a thickness of 250 μm) should be achieved, the paste for fluorescence light-emitting layer is applied by screen printing over the reflection layer 82 formed on the base substrate 80 (step S70). The base substrate 80 on which the paste for fluorescence light-emitting layer are applied so that a fluorescence light-emitting layer 84 is formed is heat-cured under the conditions of 150° C. and 30 minutes by using a heat curing furnace (step S80). As a result, the fluorescence light-emitting plate 32 is completed in which the fluorescence light-emitting layer 84 having been heat-cured is tightly and closely joined to the reflection layer 82 tightly and closely joined to the base substrate 80 (step S90). When an organic binder is employed, the base substrate 80 having a heat resistance of approximately 200° C. is employable. As the base substrate 80, even a metallic material such as aluminum and copper having a comparatively not-high heat resistance is employable.

The fluorescence light-emitting plate 32 is fixed to the shaft 73 of the motor 71 (step S100). Then, balance adjustment is performed on the fluorescence light-emitting plate 32 supported in a manner of being revolvable together with the shaft 73 of the motor 71 (step S110). After that, external appearance inspection and lighting check are performed on the fluorescence light-emitting plate 32 so that the fluorescence light-emitting plate unit 70 is completed (step S120).

An example of a production process is described below that is adopted in a case that an inorganic binder is employed when the fluorescence light-emitting layer 84 and the reflection layer 82 are formed on the fluorescence light-emitting plate 32. In a manner that a desired weight percentage (e.g., a titanium oxide content of 70 wt %) should be achieved, a vehicle containing a solvent (e.g., terpineol) and an organic binder (e.g., ethyl cellulose), a borate glass frit serving as an inorganic binder, and titanium oxide serving as a reflective material are prepared. Then, the vehicle, the borate glass frit, and the titanium oxide are stirred and mixed with each other. Then, paste for reflection layer without air bubbles is produced by using a defoaming device. Then, in a manner that a desired thickness (e.g., a thickness of 50 μm) should be achieved, the paste for reflection layer is applied on the base substrate 80 by screen printing. Then, the base substrate 80 onto which the paste for reflection layer has been applied is dried by a drier.

Then, in a manner that a desired weight percentage (e.g., a fluorescence light-emitting material content of 75 wt %) should be achieved, a vehicle and a borate glass frit identical to those used in the binder for reflection layer and a Ce-activated YAG-family phosphor serving as a fluorescence light-emitting material are prepared. Then, the vehicle, the borate glass frit, and the Ce-activated YAG-family phosphor are stirred and mixed with each other. Then, paste for fluorescence light-emitting layer without air bubbles is produced by using a defoaming device. In a manner that a desired thickness (e.g., a thickness of 250 μm) should be achieved, the paste for fluorescence light-emitting layer is applied by screen printing over the reflection layer 82 formed on the base substrate 80. By using a drier, the substrate onto which the paste for fluorescence light-emitting layer has been applied is dried under the conditions of 100° C. and 15 minutes. Then, by using a heat-treating furnace, the reflection layer 82 and the fluorescence light-emitting layer 84 formed on the base substrate 80 are heat-softened. At that time, the organic binder is burnt and the inorganic binder becomes soft, so that the reflection layer 82 having been heat-softened is tightly and closely joined to the base substrate 80. Further, simultaneously, the fluorescence light-emitting layer 84 having been heat-softened is tightly and closely joined to at the reflection layer 82. When an inorganic binder is employed, the base substrate 80 having a heat resistance of approximately 350° C. is employable. As the base substrate 80, a high heat-resistant metallic material such as stainless steel as well as a glass substrate and a silicon substrate having heat resistance are employable.

Figure 3A:
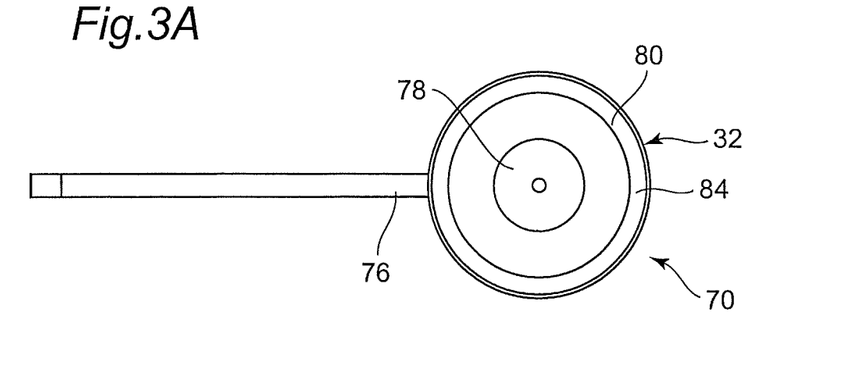
FIG. 3A is a front view showing a fluorescence light-emitting plate unit in an optical device shown in FIG. 2.
Figure 3B:
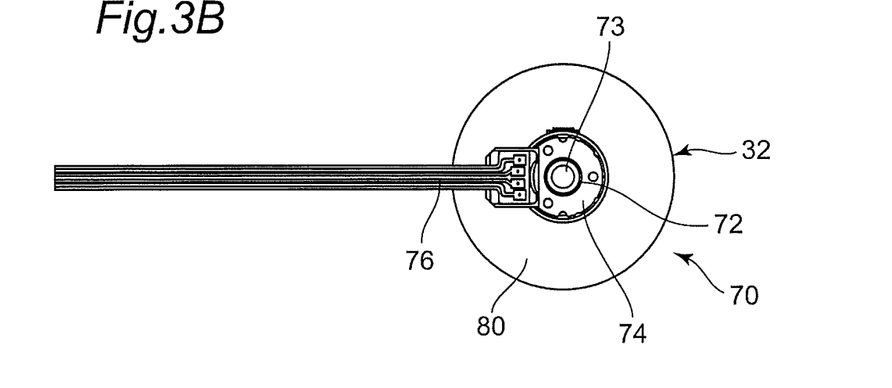
FIG. 3B is a rear view showing a fluorescence light-emitting plate unit in an optical device shown in FIG. 2.
Figure 3C:
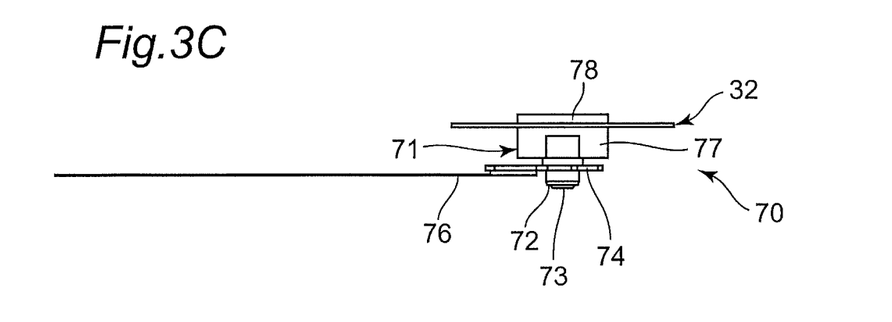
FIG. 3C is a side view showing a fluorescence light-emitting plate unit in an optical device shown in FIG. 2.

When the fluorescence light-emitting plate 32 and the motor 71 described above are assembled together, the fluorescence light-emitting plate unit 70 as shown in FIGS. 3A-3C is obtained. In FIGS. 3A-3C, the fluorescence light-emitting plate unit 70 includes the fluorescence light-emitting plate 32, the motor 71, a mounting board 74, an upper mounting member 78, a lower mounting member 77, and a flexible printed wiring board 76. The fluorescence light-emitting plate 32 b is sandwiched between the upper mounting member 78 and the lower mounting member 77. The mounting board 74 is fixed to the side surface of the casing 72 of the motor 71. Then, the flexible printed wiring board 76 is electrically connected to the mounting board 74.

For example, as a result of the following processes, the fluorescence light-emitting plate unit 70 is obtained in which the fluorescence light-emitting plate 32 and the motor 71 are assembled together. The lower mounting member 77 having a disc shape is fixed to the upper end of the shaft 73 of the motor 71. Then, the fluorescence light-emitting plate 32 is arranged on the lower mounting member 77. Then, the upper mounting member 78 having a disc shape is further arranged thereon. Organic adhesives (thermosetting adhesives or ultraviolet curing adhesives) are inserted between the lower mounting member 77 and the fluorescence light-emitting plate 32 and between the fluorescence light-emitting plate 32 and the upper mounting member 78. In this state, heat or ultraviolet light is applied so that the organic adhesives are cured and hence the fluorescence light-emitting plate 32 is fixed and sandwiched between the upper mounting member 78 and the lower mounting member 77. Then, after balance adjustment of the fluorescence light-emitting plate 32 fixed to the shaft 73 of the motor 71, external appearance inspection and lighting check is performed on the fluorescence light-emitting plate 32. As a result, a complete product of the fluorescence light-emitting plate 32 is obtained in which the fluorescence light-emitting plate and the motor are assembled together and revolve smoothly without vibrations even at a high speed.

The fluorescence light-emitting plate 32 is driven and revolved at a high speed by the motor 71 serving as a revolution driving section. The revolving speed of the fluorescence light-emitting plate 32 is, for example, 3600 rpm to 10800 rpm. Blue laser light for excitation emitted from the blue laser 25 is projected onto the fluorescence light-emitting layer 84 formed in a ring shape on the fluorescence light-emitting plate 32. The projected blue laser light excites the fluorescence light-emitting material of the fluorescence light-emitting layer 84 so that green fluorescence emission light is emitted. At the same time, a part of the emitted fluorescence emission light is reflected by the reflection layer 82 so that the reflected green fluorescence light is also emitted. As a result, green fluorescence emission light composed of the fluorescence emission light and the reflected fluorescence light is emitted from the fluorescence light-emitting plate 32.

In FIG. 2, red light emitted from the red light-emitting diode 22 is transmitted sequentially through the condenser lenses 52a and 52b, the blue reflection dichroic mirror 57, and the green-reflective dichroic mirror 58, and then condensed onto the incident surface of the rod integrator 59 by the condenser lens 52i. Blue light emitted from the blue light-emitting diode 26 is transmitted through the condenser lenses 52c and 52d, then reflected by the blue reflection dichroic mirror 57, then transmitted through the green-reflective dichroic mirror 58, and then condensed onto the incident surface of the rod integrator 59 by the condenser lens 52i.

Laser light emitted from the blue laser 25 is condensed onto the incident surface of the rod integrator 56 by the collimator lens 54 and the condenser lens 52e. The light emitted from the emission surface of the rod integrator 56 is transmitted through the condenser lens 52f and the green-reflective dichroic mirror 58 and then condensed onto the fluorescence light-emitting layer of the fluorescence reflecting plate 32 by the condenser lenses 52g and 52n. When the laser light emitted from the blue laser 25 is projected onto the fluorescence light-emitting layer 84 of the fluorescence light-emitting plate 32, green fluorescence emission light is emitted from the fluorescence light-emitting layer 84. The emitted green fluorescence emission light is transmitted through the condenser lenses 52h and 52g, then reflected by the green-reflective dichroic mirror 58, and then condensed onto the incident surface of the rod integrator 59 by the condenser lens 52i.

Thus, in the light source device 5 of the projection type display apparatus 1 shown in FIG. 2, the red light-emitting diode 22 constitutes a red light source and the blue light-emitting diode 26 constitutes a blue light source. Further, the blue laser 25 serving as an excitation light source and the fluorescence light-emitting plate 32 of the fluorescence light-emitting layer 84 constitutes the green fluorescence emission light source 24.

The rod integrators 56 and 59 are quadrangular prisms made of glass. Then, incident light repeats total reflection in the inner surfaces of each quadrangular prism so that luminance is homogenized in the emitted light. The emitted light from the rod integrator 59 is transmitted through the condenser lens 52j, the relay lens 62, the field lens 64, and the total reflection prism 66, and then enters the DMD 38 serving as an image display device. The condenser lens 52j, the relay lens 62, the field lens 64, and the total reflection prism 66 are arranged such that the emission surface shape of the rod integrator 59 is transferred onto the DMD 38 and so that light condensation is achieved uniformly at high efficiency.

Thus, the projection type display apparatus 1 shown in FIG. 2 includes: the light source device 5 provided with the red light source (the red light-emitting diode) 22, the blue light source (the blue light-emitting diode) 26, and the green fluorescence emission light source 24; and the optical device 3 for guiding emitted light from the light source device 5 to the image display device 38 so as to project onto a screen the image emitted from the image display device 38. The optical device 3 is constructed from the condenser lenses 52a to 52g, 52i, 52j, and 52n, the collimator lens 54, the dichroic mirrors 57 and 58, the rod integrators 56 and 59, the relay lens 62, the field lens 64, the total reflection prism 66, and the projection lens 50.

In the DMD (Digital Mirror Device) 38 serving as an image display device for forming an image corresponding to the video signal, a large number of small mirrors are arranged in two dimensions. Then, in response to red, green, and blue video input signals, inclinations of corresponding small mirrors are changed respectively so that light entering the DMD 38 is modulated time-dependently. For example, green fluorescence emission light from the fluorescence light-emitting layer 84, red emitted light from the red light-emitting diode 22, and blue emitted light from the blue light-emitting diode 26 are introduced into the DMD 38 and then in accordance with red, green, and blue video signals, the small mirrors are driven at a high speed by the picture element drive circuit 36. As a result, the projection lens 50 performs expansion projection of a color image from the DMD 38 onto a screen (not shown).

According to the above-mentioned configuration, excitation light emitted from the excitation light source arranged opposite to the fluorescence light-emitting section is projected onto the fluorescence light-emitting section and then reflected by the reflection section containing titanium oxide. At that time, fluorescence emission light is emitted from the fluorescence light-emitting section and, at the same time, reflected fluorescence light reflected by the reflection section is emitted. The reflection section contains titanium oxide having a high refractive index. Thus, a higher reflectivity than in the silver is obtained. Accordingly, in the reflection section containing titanium oxide, the improved reflectivity enhances the utilization efficiency of reflected light. Further, the titanium oxide employed in the reflection section is an inorganic oxide and less expensive than silver. Further, the reflection action is achieved by using the high refractive index of titanium oxide, and hence hardly affected by the interface with the substrate. This permits reduction in the cost necessary to perform surface preparation of the substrate. Further, the titanium oxide itself has oxidation resistance and heat resistance, and hence does not require a protective film of magnesium fluoride or the like. This also contributes to cost reduction. Further, the titanium oxide has a relatively satisfactory thermal conductivity. Thus, in the reflection section containing titanium oxide, reflectivity improvement and cost reduction are realized simultaneously.

Second Embodiment

The difference of a second embodiment from the first embodiment is that in the light source device 5 according to the second embodiment, the reflection layer 82 of the fluorescence light-emitting plate 32 is composed substantially of a simple substance of titanium oxide. The other points in the configuration are similar to those of the first embodiment described above.

As shown in FIGS. 4A and 4B, the fluorescence light-emitting plate 32 in the light source device 5 according to the second embodiment includes a base substrate 80, a reflection layer (a reflection section) 82 formed in close contact with the base substrate 80, and a fluorescence light-emitting layer (a fluorescence light-emitting section) 84 formed in close contact with the reflection layer 82. The reflection layer 82 formed on the base substrate 80 and containing titanium oxide contains neither an organic binder nor an inorganic binders and is composed substantially of a simple substance of titanium oxide.

The method of forming on the base substrate 80 the reflection layer 82 composed substantially of a simple substance of titanium oxide is, for example: a method of thin film formation such as sputtering, vapor deposition, and CVD; a sintering method that a mixed powder material composed of titanium oxide fine powder and a sintering additive is sintered; or a sol-gel method that an undiluted solution is produced by hydrolysis of titanium alkoxide and then applied, dried, and heated so that a titanium oxide film is obtained. In a case that only an insufficient thickness is obtained in the reflection layer 82 by a single time of formation, a desired thickness (e.g., a thickness of 50 μm) is obtained by repeating the film formation process. The reflection layer 82 obtained by such a method is a film-shaped body composed substantially of a simple substance of titanium oxide without a binder. In a production process for titanium oxide in which high-temperature heat treatment becomes necessary, a base substrate 80 (e.g., a stainless steel substrate, a glass substrate, an alumina substrate, and a silicon substrate) is employed that has a higher heat resistance than the one in the case of that the inorganic binder is employed as described in the first embodiment.

When the reflection layer 82 is constructed from a film-shaped body substantially composed of titanium oxide alone, the thermal conductivity increases in the reflection layer 82. This suppresses a temperature rise in the fluorescence light-emitting layer 84 and hence improves the conversion efficiency of the fluorescence light-emitting layer 84. The reflection layer 82 constructed from a film-shaped body substantially composed of titanium oxide alone has a high light resistance and a high heat resistance. Thus, this construction contributes to improvement in the reliability of the fluorescence light-emitting plate 32. The reflection layer 82 substantially composed of titanium oxide alone and constructed from a film-shaped body is excellent in heat radiation property, heat resistance, and light resistance. Thus, even when blue laser light is projected intensively, a problem is hardly caused. According, especially in the configuration that the fluorescence light-emitting layer 84 contains an inorganic binder, high-speed revolution of the fluorescence light-emitting plate 32 becomes unnecessary and hence the fluorescence light-emitting plate 32 may be used in a low-speed revolution state or in a stationary state. This permits further cost reduction.

Third Embodiment

Figure 6A:
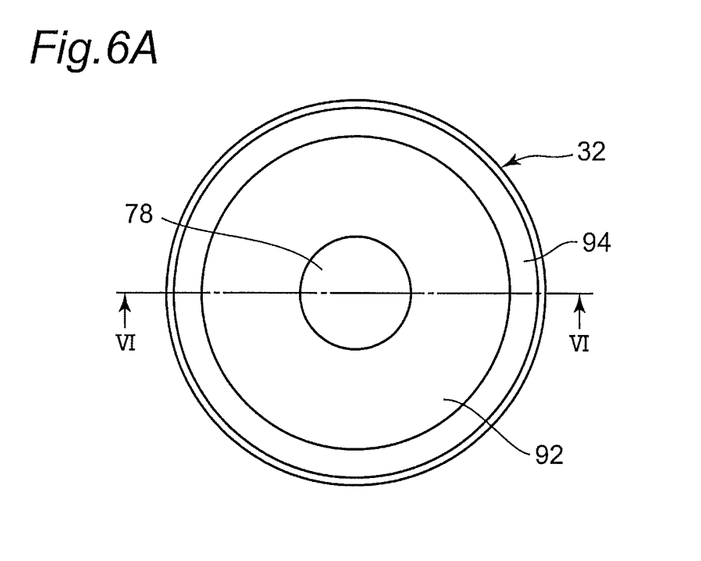
FIG. 6A is a front view showing a fluorescence light-emitting plate according to a third embodiment of the present disclosure.
Figure 6B:
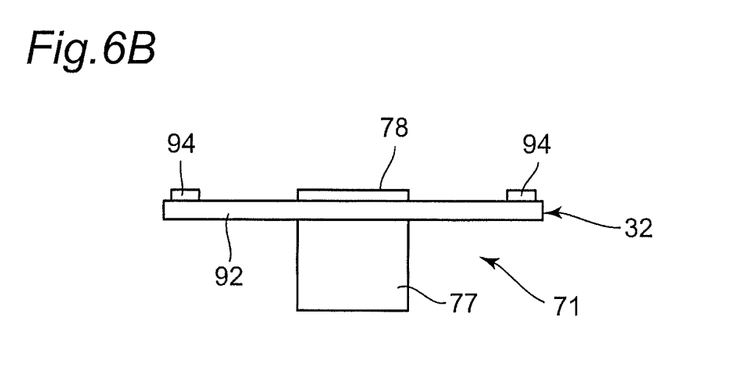
FIG. 6B is a sectional view taken along line VI-VI showing a fluorescence light-emitting plate according to a third embodiment of the present disclosure.

FIGS. 6A and 6B are a diagram showing a fluorescence light-emitting plate 32 in a light source device 5 according to a third embodiment of the present disclosure, respectively.

The difference of the third embodiment from the first embodiment and the second embodiment is that in the light source device 5 according to the third embodiment, the fluorescence light-emitting plate 32 does not employ the base substrate 80 on which the reflection layer 82 and the fluorescence light-emitting layer 84 are formed and supported. The other points in the configuration are similar to those of the first embodiment and the second embodiment.

As shown in FIGS. 6A and 6B, the fluorescence light-emitting plate 32 according to the third embodiment includes: a plate-shaped reflector (a reflection section) 92 containing titanium oxide; and a fluorescence light-emitting layer (a fluorescence light-emitting section) 94 formed in close contact with the reflector 92. In FIG. 6B, excitation light from the blue laser 25 (not shown) serving as an excitation light source is projected from the upward direction to downward direction onto the fluorescence light-emitting layer 94. Thus, the reflector 92 is arranged on the opposite side of the blue laser 25 with respect to the fluorescence light-emitting layer 94.

The plate-shaped reflector 92 containing titanium oxide has the support function like the base substrate 80 shown in FIGS. 4A and 4B and the reflection function like the reflection layer 82. The thickness of the reflector 92 is, for example, 0.2 mm to 1.5 mm. When the reflector 92 is thinner than 0.2 mm, handling thereof becomes inconvenient. When the reflector 92 is thicker than 1.5 mm, a cost increase and a size increase are caused.

The reflector 92 may be in the form of a composite material composed of glass and titanium oxide. When an inorganic binder such as glass is employed, the thermal conductivity increases in the reflector 92. This suppresses a temperature rise in the fluorescence light-emitting layer 94 and hence improves the conversion efficiency of the fluorescence light-emitting layer 94. Further, the inorganic binder has a high light resistance and a high heat resistance. Thus, this construction contributes to improvement in the reliability of the fluorescence light-emitting plate 32. The reflector 92 constructed from a composite material composed of glass and titanium oxide is excellent in heat radiation property, heat resistance, and light resistance. Thus, even when blue laser light is projected intensively, a problem is hardly caused. According, especially in the configuration that the fluorescence light-emitting layer 94 contains an inorganic binder, high-speed revolution of the fluorescence light-emitting plate 32 becomes unnecessary and hence the fluorescence light-emitting plate 32 may be used in a low-speed revolution state or in a stationary state. This permits further cost reduction.

The reflector 92 constructed from a composite material is obtained as follows. That is, in a manner that a desired weight percentage (e.g., a titanium oxide content of 70 wt %) should be achieved, a glass frit and titanium oxide powder are prepared and mixed with each other and then pressed into a tablet-shaped body. Then, heat treatment is performed on the tablet-shaped body at the softening temperature of the glass so that the reflector 92 is obtained. Further, in the fluorescence light-emitting plate 32 not employing the base substrate 80, the reflector 92 may be constructed from a plate-shaped body substantially composed of titanium oxide alone. The plate-shaped body substantially composed of titanium oxide alone may be constructed from a sintered body obtained by sintering raw material powder composed of fine powder of titanium oxide and a sintering additive. Alternatively, similarly to the second embodiment, the plate-shaped body substantially composed of titanium oxide alone may be produced by a sol-gel method that an undiluted solution is produced by hydrolysis of titanium alkoxide, and then applied, dried, and heated so that a titanium oxide film is obtained. Thus, without employing the base substrate 80 as shown in the first embodiment and the second embodiment, the fluorescence light-emitting plate 32 is obtained in which the fluorescence light-emitting layer 94 is formed on the reflector 92 containing titanium oxide.

When the reflector 92 is constructed from a plate-shaped body substantially composed of titanium oxide alone, the thermal conductivity increases in the reflector 92. This suppresses a temperature rise in the fluorescence light-emitting layer 94 and hence improves the conversion efficiency of the fluorescence light-emitting layer 94. The reflector 92 constructed from a plate-shaped body substantially composed of titanium oxide alone has a high light resistance and a high heat resistance. Thus, this construction contributes to improvement in the reliability of the fluorescence light-emitting plate 32. The reflector 92 constructed from a plate-shaped body substantially composed of titanium oxide alone is excellent in heat radiation property, heat resistance, and light resistance. Thus, even when blue laser light is projected intensively, a problem is hardly caused. According, especially in the configuration that the fluorescence light-emitting layer 94 contains an inorganic binder, high-speed revolution of the fluorescence light-emitting plate 32 becomes unnecessary and hence the fluorescence light-emitting plate 32 may be used in a low-speed revolution state or in a stationary state. This permits further cost reduction.

Example 1

Next, Example 1 of the projection type display apparatus 1 employing the light source device 5 is described below. In Example 1, in a state that the thickness of the fluorescence light-emitting layer 84 was maintained at a particular fixed value (e.g., 250 µm), the relationship was examined between the thickness of the reflection layer 82 containing titanium oxide and the conversion efficiency.

First, as the base substrates 80, aluminum substrates (made by Sumitomo Light Metal Industries, Ltd.) were prepared. In a manner that the titanium oxide content should become 50 volt, two-component silicone resin serving as an organic binder (made by Shin-Etsu Chemical Co., Ltd.) and titanium oxide (of rutile type) serving as a reflective material were prepared. Then, the silicone resin and the titanium oxide were stirred and mixed with each other. Then, paste for reflection layer without air bubbles was produced by using a defoaming device. In a manner that various thicknesses (e.g., thicknesses from 10 µm to 430 µm) should be realized, the paste for reflection layer was applied on the base substrate 80 by screen printing. Then, the base substrates 80 on each of which the reflecting layer 82 was formed were heat-cured under the conditions of 150° C. and 30 minutes by using a heat curing furnace.

Next, in a manner that the fluorescence light-emitting material content should become 50 vol %, a two-component silicone resin (made by Shin-Etsu Chemical Co., Ltd.) the same as that used as a binder for reflection layer and a Ce-activated YAG-family phosphor serving as a fluorescence light-emitting material were prepared. Then, the silicone resin and the Ce-activated YAG-family phosphor were stirred and mixed with each other. Then, paste for fluorescence light-emitting layer without air bubbles was produced by using a defoaming device. In a manner that the thickness should become 250 µm, the paste for fluorescence light-emitting layer was applied by screen printing over the reflection layer 82 formed on the base substrate 80. Then, the base substrates 80 on each of which the fluorescence light-emitting layer 84 was formed were heat-cured under the conditions of 150° C. and 30 minutes by using a heat curing furnace. As a result, the fluorescence light-emitting plates 32 were obtained in each of which the fluorescence light-emitting layer 84 having been heat-cured was tightly and closely joined to the reflection layer 82 tightly and closely joined to the base substrate 80. Each fluorescence light-emitting plate 32 was mounted to the motor 71 and then balance adjustment was performed on the fluorescence light-emitting plate 32, so that the fluorescence light-emitting plate unit 70 was obtained.

The relationship between the thickness of the reflection layer 82 and the conversion efficiency was measured by the following experimental method. That is, blue laser light (a laser power of 40 W) from the blue laser 25 was projected on a laser power meter arranged at the position of the fluorescence light-emitting layer 84 of the fluorescence light-emitting plate 32. Then, the light energy at that time was measured and adopted as a first measurement value.

Next, the fluorescence light-emitting plate unit 70 was built into the projection type display apparatus 1 and then blue laser light (a laser power of 40 W) from the blue laser 25 was projected on the fluorescence light-emitting layer 84 of the fluorescence light-emitting plate 32. Then, green fluorescence emission light emitted from the fluorescence light-emitting layer 84 in association with the projection of blue laser light was received by the laser power meter arranged at the position of the incident surface of the rod integrator 59. Then, the light energy at that time was measured and adopted as a second measurement value.

Taking into consideration the losses in the transmittances of the lenses and the dichroic mirrors in the optical system of the optical device 3 and in the reflectivities of the dichroic mirrors as a correction coefficient, the conversion efficiency was calculated for a case that blue laser light was converted into green fluorescence emission light.

Here, the conversion efficiency was calculated by a math formula of (correction coefficient)×(second measurement value)/(first measurement value).

The measurement results obtained by the above-mentioned experimental method are summarized in Table 1.

TABLE 1

| | Thickness of fluorescence light-emitting layer (µm) | Thickness of reflection layer (µm) | Conversion efficiency (%) |
|---|---|---|---|
| Sample 1 | 250 | 10 | 63 |
| Sample 2 | 250 | 50 | 63.5 |
| Sample 3 | 250 | 70 | 63.2 |
| Sample 4 | 250 | 100 | 63 |
| Sample 5 | 250 | 250 | 62 |
| Sample 6 | 250 | 300 | 61.8 |
| Sample 7 | 250 | 330 | 61.5 |
| Sample 8 | 250 | 350 | 60 |
| Comparison 1 | 250 | 0 | 57 |
| Comparison 2 | 250 | 380 | 59 |
| Comparison 3 | 250 | 430 | 58 |

As seen from Table 1 given above, in all of Samples 1 to 8 where the thickness of the reflection layer 82 containing titanium oxide was 10 μm to 350 μm, the conversion efficiency was 60% or higher. This indicates improvement in the conversion efficiency in comparison with the prior art (Comparison 1), and sufficiently satisfies a specification required in the light source device 5 of the projection type display apparatus 1. In particular, in all of Samples 1 to 4 where the thickness of the reflection layer 82 containing titanium oxide was 10 μm to 100 μm, the conversion efficiency was 63% or higher. This indicates a remarkably high conversion efficiency.

In contrast, in Comparison 1 where the reflection layer 82 of titanium oxide is not employed, the reflection action by titanium oxide is not obtained. Thus, the conversion efficiency was low. In Comparisons 2 and 3 where the thickness of the reflection layer 82 containing titanium oxide was 380 μm and 430 μm, the heat radiation property in the reflection layer 82 was insufficient and hence a temperature rise was caused in the fluorescence light-emitting layer 84. This has caused a low conversion efficiency.

Example 2

Next, Example 2 of the projection type display apparatus 1 employing the light source device 5 is described below. In Example 2, in a state that the thickness of the reflection layer 82 containing titanium oxide was maintained at a particular fixed value (e.g., 70 μm), the relationship was examined between the thickness of the fluorescence light-emitting layer 84 and the conversion efficiency.

First, as the base substrates 80, aluminum substrates (made by Sumitomo Light Metal Industries, Ltd.) were prepared. In a manner that the titanium oxide content should become 50 vol %, two-component silicone resin serving as an organic binder (made by Shin-Etsu Chemical Co., Ltd.) and titanium oxide (of rutile type) serving as a reflective material were prepared. Then, the silicone resin and the titanium oxide were stirred and mixed with each other. Then, paste for reflection layer without air bubbles was produced by using a defoaming device. In a manner that a thickness of 70 μm should be realized, the paste for reflection layer was applied on the base substrate 80 by screen printing. Then, the base substrates 80 on each of which the reflecting layer 82 was formed were heat-cured under the conditions of 150° C. and 30 minutes by using a heat curing furnace.

Next, in a manner that the fluorescence light-emitting material content should become 50 vol %, a two-component silicone resin (made by Shin-Etsu Chemical Co., Ltd.) the same as that used as a binder for reflection layer and a Ce-activated YAG-family phosphor serving as a fluorescence light-emitting material were prepared. Then, the silicone resin and the Ce-activated YAG-family phosphor were stirred and mixed with each other. Then, paste for fluorescence light-emitting layer without air bubbles was produced by using a defoaming device. In a manner that various thicknesses (e.g., thicknesses from 20 μm to 550 μm) should be realized, the paste for fluorescence light-emitting layer was applied by screen printing over the reflection layer 82 formed on the base substrate 80. Then, the base substrates 80 on each of which the fluorescence light-emitting layer 84 was formed were heat-cured under the conditions of 150° C. and 30 minutes by using a heat curing furnace. As a result, the fluorescence light-emitting plates 32 were obtained in each of which the fluorescence light-emitting layer 84 having been heat-cured was tightly and closely joined to the reflection layer 82 tightly and closely joined to the base substrate 80. Each fluorescence light-emitting plate 32 was mounted to the motor 71 and then balance adjustment was performed on the fluorescence light-emitting plate 32, so that the fluorescence light-emitting plate unit 70 was obtained.

The relationship between the thickness of the reflection layer 82 and the conversion efficiency was measured by the following experimental method. That is, blue laser light (a laser power of 40 W) from the blue laser 25 was projected on a laser power meter arranged at the position of the fluorescence light-emitting layer 84 of the fluorescence light-emitting plate 32. Then, the light energy at that time was measured and adopted as a first measurement value.

Next, the fluorescence light-emitting plate unit 70 was built into the projection type display apparatus 1 and then blue laser light (a laser power of 40 W) from the blue laser 25 was projected on the fluorescence light-emitting layer 84 of the fluorescence light-emitting plate 32. Then, green fluorescence emission light emitted from the fluorescence light-emitting layer 84 in association with the projection of blue laser light was received by the laser power meter arranged at the position of the incident surface of the rod integrator 59. Then, the light energy at that time was measured and adopted as a second measurement value.

Taking into consideration the losses in the transmittances of the lenses and the dichroic mirrors in the optical system of the optical device 3 and in the reflectivities of the dichroic mirrors as a correction coefficient, the conversion efficiency was calculated for a case that blue laser light was converted into green fluorescence emission light.

Here, the conversion efficiency was calculated by a math formula of (correction coefficient)×(second measurement value)/(first measurement value).

The measurement results obtained by the above-mentioned experimental method are summarized in Table 2.

TABLE 2

| | Thickness of fluorescence light-emitting layer (μm) | Thickness of reflection layer (μm) | Conversion efficiency (%) |
| --- | --- | --- | --- |
| Sample 11 | 50 | 70 | 62 |
| Sample 12 | 55 | 70 | 61.9 |
| Sample 13 | 75 | 70 | 62 |
| Sample 14 | 110 | 70 | 62.1 |
| Sample 15 | 120 | 70 | 62.3 |
| Sample 16 | 200 | 70 | 63 |
| Sample 17 | 220 | 70 | 63.8 |
| Sample 18 | 230 | 70 | 63.5 |
| Sample 19 | 250 | 70 | 63 |
| Sample 20 | 300 | 70 | 63 |
| Sample 21 | 320 | 70 | 61.7 |
| Sample 22 | 350 | 70 | 61.8 |
| Sample 23 | 370 | 70 | 60.8 |
| Sample 24 | 400 | 70 | 60 |
| Comparison 11 | 20 | 70 | 57.2 |
| Comparison 12 | 30 | 70 | 58.5 |
| Comparison 13 | 450 | 70 | 59.8 |
| Comparison 14 | 500 | 70 | 58.5 |
| Comparison 15 | 550 | 70 | 57.2 |

As seen from Table 2 given above, in all of Samples 11 to 24 where the reflection layer 82 containing titanium oxide was employed and the thickness of the fluorescence light-emitting layer 84 was 50 μm to 400 μm, the conversion efficiency was 60% or higher. This indicates improvement in the conversion efficiency in comparison with Comparisons 11 to 15, and sufficiently satisfies a specification required in the light source device 5 of the projection type display apparatus 1. In particular, in all of Samples 16 to 20 where the thickness of the fluorescence light-emitting layer 84 was 200 μm to 300

μm, the conversion efficiency was 63% or higher. This indicates a remarkably high conversion efficiency.

In contrast, in Comparisons 11 and 12 where the thickness of the fluorescence light-emitting layer 84 was 20 μm and 30 μm, only a small amount of fluorescence light-emitting material is present in the fluorescence light-emitting layer 84. This has caused a low conversion efficiency. Further, in Comparisons 13 to 15 where the thickness of the fluorescence light-emitting layer 84 was 450 μm to 550 μm, the frequency increases that fluorescence emission light emitted in association with the projection of excitation light is absorbed inside the fluorescence light-emitting layer 84. This has caused a low conversion efficiency.

Example 3

Measurements similar to the above-mentioned ones were performed for a case that the reflection layer 82 and the fluorescence light-emitting layer 84 were formed on the base substrate 80 and that a binder of the same type composed of a borate glass was employed for the binder in the reflection layer 82 and the binder in the fluorescence light-emitting layer 84. As a result, in a case that the thickness of the reflection layer 82 was maintained at a particular fixed value (70 μm) and that the thickness of the fluorescence light-emitting layer 84 was changed, the same tendency as that in Table 2 was obtained. That is, in a case that the thickness of the fluorescence light-emitting layer 84 was 50 μm to 400 μm, the conversion efficiency was 60% or higher. Further, in a case that the thickness of the fluorescence light-emitting layer 84 was 200 μm to 300 μm, the conversion efficiency was 63% or higher.

In a case that the thickness of the reflection layer 82 was changed and that the thickness of the fluorescence light-emitting layer 84 was fixed, a different behavior from that in Table 1 was obtained. That is, in a case that the thickness of the reflection layer 82 was 10 μm or thicker, the conversion efficiency was 60% or higher. In a case that the thickness of the reflection layer 82 was 10 μm to 100 μm, the conversion efficiency was 63% or higher. The reason of improvement of the conversion efficiency is expected to be that inorganic binders have excellent thermal conductivities than organic binders and hence the heat radiation property of the reflection layer 82 is improved. Accordingly, a temperature rise in the fluorescence light-emitting layer 84 is suppressed and hence the conversion efficiency is improved.

Example 4

Measurements similar to the above-mentioned ones were performed for a case that the reflection layer 82 composed substantially of a simple substance of titanium oxide was formed by a sol-gel method onto the base substrate 80 composed of a glass substrate and then the fluorescence light-emitting layer 84 employing a binder composed of a silicone resin or a borate glass was formed thereon. As a result, in a case that the thickness of the reflection layer 82 was maintained at particular fixed value (70 μm) and that the thickness of the fluorescence light-emitting layer 84 was changed, the same tendency as that in Table 2 was obtained. That is, in a case that the thickness of the fluorescence light-emitting layer 84 was 50 μm to 400 μm, the conversion efficiency was 60% or higher. Further, in a case that the thickness of the fluorescence light-emitting layer 84 was 200 μm to 300 μm, the conversion efficiency was 63% or higher.

In a case that the thickness of the reflection layer 82 was changed and that the thickness of the fluorescence light-emitting layer 84 was fixed, a different behavior from that in Table 1 was obtained. That is, in a case that the thickness of the reflection layer 82 was 10 μm or thicker, the conversion efficiency was 60% or higher. In a case that the thickness of the reflection layer 82 was 10 μm to 100 μm, the conversion efficiency was 63% or higher. The reason of improvement of the conversion efficiency is expected to be that the reflection layer 82 substantially composed of a simple substance of titanium oxide has an excellent thermal conductivity and hence the heat radiation property of the reflection layer 82 is improved and a temperature rise in the fluorescence light-emitting layer 84 is suppressed so that the conversion efficiency is improved.

Example 5

Measurements similar to the above-mentioned ones were performed also for a case that the reflector 92 constructed from a composite material composed of a borate glass and titanium oxide was formed and then the fluorescence light-emitting layer 94 employing a binder composed of a silicone resin or a borate glass was formed thereon. As a result, in a case that the thickness of the reflector 92 was maintained at a particular fixed value (1 mm) and that the thickness of the fluorescence light-emitting layer 94 was changed, the same tendency as that in Table 2 was obtained. That is, in a case that the thickness of the fluorescence light-emitting layer 94 was 50 μm to 400 μm, the conversion efficiency was 60% or higher. Further, in a case that the thickness of the fluorescence light-emitting layer 94 was 200 μm to 300 μm, the conversion efficiency was 63% or higher.

In a case that the reflector 92 had a thickness required as a supporting board on which the fluorescence light-emitting layer 94 was to be formed, that is, in a case that the reflector 92 had a thickness of 200 μm or thicker, the conversion efficiency was 60% or higher. The composite material composed of a borate glass and titanium oxide serves as the base substrate 80 and, at the same time, serves as the reflector 92. The reason of improvement of the conversion efficiency is expected to be that the reflector 92 constructed from a composite material composed of a borate glass and titanium oxide has an excellent thermal conductivity and hence the heat radiation property of the reflector 92 is improved so that a temperature rise is suppressed in the fluorescence light-emitting layer 94 and hence the conversion efficiency is improved.

Example 6

Measurements similar to the above-mentioned ones were performed for a case that the reflector 92 constructed from a sintered body of titanium oxide was formed and then the fluorescence light-emitting layer 94 employing a binder composed of a silicone resin or a borate glass was formed thereon. As a result, in a case that the thickness of the reflector 92 was maintained at a particular fixed value (1 mm) and that the thickness of the fluorescence light-emitting layer 94 was changed, the same tendency as that in Table 2 was obtained. That is, in a case that the thickness of the fluorescence light-emitting layer 94 was 50 μm to 400 μm, the conversion efficiency was 60% or higher. Further, in a case that the thickness of the fluorescence light-emitting layer 94 was 200 μm to 300 μm, the conversion efficiency was 63% or higher.

In a case that the reflector 92 had a thickness required as a supporting board on which the fluorescence light-emitting layer 94 was to be formed, that is, in a case that the reflector 92 had a thickness of 200 μm or thicker, the conversion efficiency was 60% or higher. The ceramic sintered body of titanium oxide serves as a base substrate and, at the same time, serves as the reflector 92. The reason of improvement of the conversion efficiency is expected to be that the reflector 92 constructed from the ceramic sintered body of titanium oxide has an excellent thermal conductivity and hence the heat radiation property of the reflector 92 is improved and a temperature rise in the fluorescence light-emitting layer 94 is suppressed so that the conversion efficiency is improved.

Here, in the above-mentioned projection type display apparatus 1, the DMD 38 is employed as an image display device. However, a liquid crystal panel of transmission type or reflection type may be employed as the image display device. The liquid crystal panel (not shown) includes a large number of pixels arranged in two dimensions in correspondence to red, green, and blue. These pixels are controlled independently in correspondence to external signals by the image display device drive circuit 36. That is, the transmittance for light transmitted through or reflected by the liquid crystal panel is controlled for each pixel in response to the external signal. Then, the light having been transmitted through or reflected by the liquid crystal panel is projected through the projection lens 50 onto a screen (not shown) so that expansion projection of a color image from the liquid crystal panel is achieved.

Here, the above-mentioned embodiments shall be recognized as merely illustrative and as non-restrictive. The scope of the present disclosure is specified by the claims rather than the embodiments given above, and contains all kinds of modifications as long as not departing from the scope and the spirit of the present disclosure.

The invention claimed is:

1. A light source device comprising:
an excitation light source; and
a fluorescence light-emitting plate including a fluorescence light-emitting section arranged opposite to said excitation light source and a reflection section containing titanium oxide located on the opposite side of said excitation light source as viewed from the side of the fluorescence light-emitting section and arranged such as to be joined to the fluorescence light-emitting section,
wherein said reflection section comprises a reflection layer formed on a substrate and the reflection layer comprises titanium oxide and a binder,
said fluorescence light-emitting section comprises a fluorescence light-emitting material and a binder,
the binder of said reflection layer and the binder of said fluorescence light-emitting section are an organic binder or an inorganic binder, and
in the binder of said reflection layer and the binder of said fluorescence light-emitting section, a refractive index difference is 0.1 or smaller.

2. The light source device according to claim 1, wherein a thickness of said fluorescence light-emitting section is 50 μm to 400 μm.

3. The light source device according to claim 1, wherein a thickness of said fluorescence light-emitting section is 200 μm to 300 μm.

4. The light source device according to claim 1, wherein a thickness of said reflection section is 10 μm to 350 μm.

5. The light source device according to claim 1, wherein a thickness of said reflection section is 10 μm to 100 μm.

6. The light source device according to claim 1, wherein said reflection section is constructed from a plate-shaped body composed of titanium oxide or a plate-shaped body containing titanium oxide.

7. The light source device according to claim 1, wherein the titanium oxide in said reflection section has a rutile type crystal structure.

8. The light source device according to claim 1, wherein a revolution driving section is provided for revolving said fluorescence light-emitting plate.

9. The light source device according to claim 8, wherein said substrate has a disc shape and said reflection layer is formed in a ring shape.

10. The light source device according to claim 1, wherein said excitation light source is a blue laser and said fluorescence light-emitting section is constructed from a green fluorescence light-emitting section or a red fluorescence light-emitting section.

11. The light source device according to claim 1, wherein said excitation light source is an ultraviolet range laser and said fluorescence light-emitting section is constructed from a blue fluorescence light-emitting section, a green fluorescence light-emitting section, or a red fluorescence light-emitting section.

12. A projection type display apparatus comprising:
a light source device according to claim 1;
an image display device for forming an image corresponding to a video signal; and
an optical device for guiding light from said light source device to said image display device so as to project onto a screen an image emitted from said image display device.

* * * * *